July 8, 1952  A. R. WORSTER  2,602,429
FLUID ACTUATED REGULATOR
Filed Dec. 18, 1948
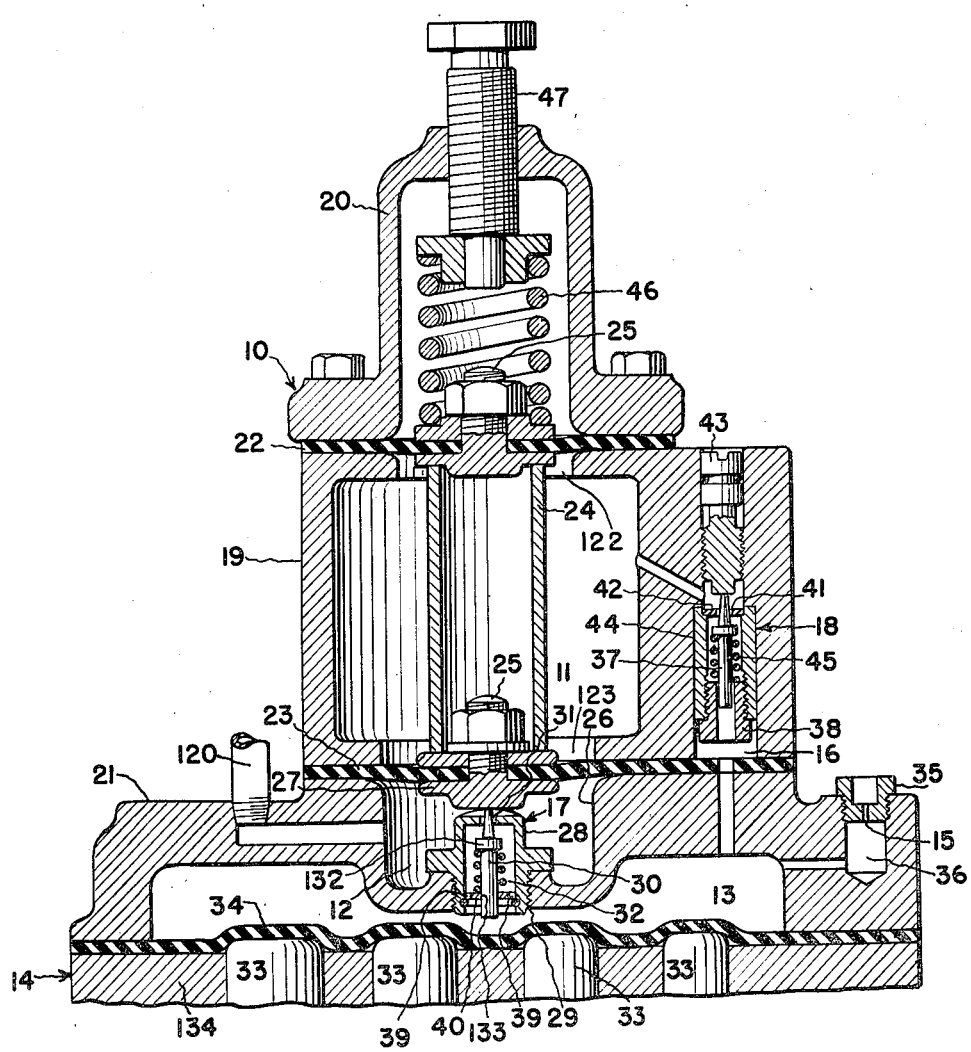
INVENTOR
Arthur R Worster
BY
HIS ATTORNEY.

Patented July 8, 1952

2,602,429

UNITED STATES PATENT OFFICE 2,602,429

FLUID ACTUATED REGULATOR

Arthur R. Worster, Painted Post, N. Y., assignor to Ingersoll-Rand Company, New York, N. Y., a corporation of New Jersey Application December 18, 1948, Serial No. 66,051

11 Claims. (Cl. 121—41)

This invention relates to regulators and more particularly to regulators which are adapted to pressure operated control devices for adjusting the output pressure of a compressor, or similar machine, in accordance with the load demand thereon.

As is well known to those familiar with the art, the receiver pressure for a compressor will vary in accordance with the demand unless the output of the compressor is varied in accordance with this demand. There are, of course, various types of control devices which act to maintain a constant output from the compressor by opening and closing clearance or by-pass valves for the compressor in accordance with the demand. However, many of these devices are extremely complicated in structure and function and are, accordingly, expensive to construct and often require considerable attention in their maintenance. Also, some of these devices, due to their operating characteristics, act immediately upon any change in demand to actuate said valves in an effort to maintain a constant output pressure. This leads to erratic operation of the compressor under conditions wherein the fluctuations in demand are of short duration.

It is, accordingly, one object of this invention to control the output pressure of the compressor in accordance with demand changes of predetermined duration.

A further object of this invention is to provide a regulator which is simple and rugged in construction.

Other objects will become obvious from the following specification and accompanying drawing showing a vertical elevation, partly in section, of a regulator constructed in accordance with the practice of the invention and adapted to a conventional control element.

Referring to the drawing, a preferred form of the regulator is shown which comprises, in general, a body defining a reset chamber 11, a pressure chamber 12 and a control chamber 13, the latter chamber being exposed to a conventional control means 14 which acts responsively to changes in the value of pressure within the control chamber 13 to control the output of the compressor (not shown) or other machine to which the regulating device is adapted.

The value of the fluid pressure in the chamber 13 is dependent, in general, on the pressure in the chamber 12, communicated by a conduit 120 with that portion of the system in which it is desired to maintain a constant pressure, and more particularly on the difference in the rates of flow of fluid into and out of the chamber 13. The rate of flow of pressure fluid into the control chamber 13 from the chamber 12 is regulated by a valve, designated in general by 17, actuated in response to changes in the pressure differential which exists between the chambers 11 and 12, and the rate of flow of pressure fluid from the chamber 13 is regulated by the size of an outlet, such as the fixed orifice or bleed 15, communicating the chamber 13 with the atmosphere.

It is to be noted that this arrangement of the chambers 12 and 13 and associated fluid passages provides a pressure amplifier in that a slight change in pressure in the chamber 12 will cause the valve mechanism 17 to vary, further, the rate of flow of fluid into the chamber 13 thereby causing a relatively large change in pressure in the latter chamber. Under circumstances wherein the initial change in pressure in the chamber 12 does not result in a change in pressure in the control chamber 13 sufficient to effect the operation of the control means 14 to return the pressure in the chamber 12 to the predetermined desired pressure value, the resultant pressure differential which exists between the reset chamber 11 and the control chamber 13 causes a further change in the setting of the valve 17. In furtherance to this end, a means is provided to vary the pressure in the reset chamber in response to variations in pressure in the control chamber. To accomplish this function in the illustrated form of the invention, the chamber 11 is communicated with the chamber 13 by a passage 16, through which the rate of flow of fluid is controlled by a valve, designated in general by 18.

Briefly, then, with the arrangement described, changes of pressure in the chamber 12 are amplified in the chamber 13 thereby rendering the control means 14 extremely sensitive to small changes of pressure in the chamber 12 to vary the output of a compressor (not shown) or other machine to which it is connected. If this change in pressure is sustained for a predetermined period of time, determined by the setting of the valve 18, the bleeding action that occurs between the reset chamber 11 and the chamber 13 will cause further changes in the setting of the valve 17 to effect the return of the output pressure of the compressor (not shown) to the predetermined desired value in a manner explained in greater detail hereinafter.

Considering the structure and function of the regulator in greater detail, the body 10 of the regulator is made up of a central section 19 and end sections 20 and 21. The central section 19 defines the chamber 11, and is shown as being of generally tubular shape with openings 122 and 123 at its opposite ends. These ends are enclosed by diaphragms 22 and 23 clamped between the opposite ends of the section 19 and the end sections 20 and 21, respectively.

In order to limit the movement of the diaphragms 22 and 23 in response to changes in pressure within the chamber 11 and simultaneously utilize these variations in pressure to actuate the valve 17, the opening 122 is formed with a somewhat smaller diameter than the opening 123 so that the diaphragms 22 and 23 have unequal surface areas exposed to fluid pressure within the reset chamber 11. A tubular member 24 extends between and is clamped at its opposite ends to the diaphragms 22 and 23 by flanged bolts 25. The diaphragm, in this instance, having the said larger surface area is 23, so that pressure fluid in the chamber 11 exerts a downwardly directed net force on the diaphragm 23. The opposite side of this diaphragm 23 is exposed to fluid pressure within the pressure chamber 12 defined by a recess 26 in the section 21. Thus, the diaphragm 23 moves in response to changes in the pressure differential which exists between the reset chamber 11 and the pressure chamber 12; any increase in pressure in chamber 12 or decrease in pressure in chamber 11 results in movement of the diaphragm 23 in the upward direction, a converse change of these pressures results, of course, in movement of the diaphragm in the opposite, or downward, direction.

The reciprocative motion of the diaphragm 23 is utilized to control the flow of fluid from the pressure chamber 12 to the control chamber 13 and, accordingly, the valve 17 is arranged to be actuated by such movement. To this end, the valve 17 comprises a valve housing 28, threaded in an opening 29 between the chambers 12 and 13, in which is mounted a spring pressed needle valve 30, the tapered end of which extends through an orifice 31 in the housing 28 into contact with a head 27 on the bolt 25 clamped to the diaphragm 23. In the embodiment as shown, the needle valve 30 tapers in the direction of the head 27 so that the flow area through the orifice 31 increases as the valve 30 is forced into the housing against the pressure of the spring 32 biased between an abutment 132 on the valve 30 and a mounting or guide plate 40 disposed in the housing 28 and having a central hole 133 through which the valve 30 slidably extends.

Disposed on the side of the section 21 opposite to the recess 26 is the control chamber 13, the open end of which is enclosed by a plate 134 of the control means 14. The control means 14 may be of any conventional type control device which is actuated in response to changes in fluid pressure. For the sake of illustration, the control means shown comprises a plurality of control elements 33, the ends of which have unequal cross sectional areas exposed to the pressure within the chamber and which are, accordingly, actuated at various predetermined values of pressure within the chamber 13. In order to prevent the leakage of fluid from the control chamber 13 along the elements 33, a blanket or diaphragm 34 is placed over the ends of the elements 33 extending into the chamber 13 and its marginal portion is clamped between the section 21 and the plate 134, thereby obviating the need for a tight fit between the elements 33 and the plate 134 in which they are slidably mounted.

Fluid, however, is allowed to escape from the chamber 13 at a predetermined rate through the valve 18 and the orifice 15 in a plug 35 threaded in a passage 36 communicating the chamber 13 with a constant pressure source such as the atmosphere. The valve mechanism 18 is, in construction, similar to the valve mechanism 17 with the exception that the needle valve 37 of the valve 18 is mounted loosely in its guide 38 in order to provide a flow path for fluid passing through the valve; whereas in the valve 17 holes 39 are provided in the mounting plate 40 for passage of fluid through this valve 17.

Adjustment of the needle valve 37 to regulate the flow area through the orifice 41, in a plate 42, through which the needle valve 37 extends, is accomplished by means of a plug 43 threaded in a branch of the passage 16 and bearing against the tapered end of the needle valve 37. In this instance, as was in the case of the valve 17, movement of the needle valve 37 into its housing 44, journaled in the passage 16, against the pressure of the spring 45, tends to increase the flow area through the orifice 41. Such downward movement is accomplished by right hand rotation of the plug 43.

With this arrangement, the pressure differential which exists between the control chamber 13 and the pressure chamber 12 is dependent on the difference in flow areas between the orifice 15 and the orifice 31; and the delayed action of the valve 30 in response to changes in pressure in the chamber 11 resulting from a differential in pressure between the chamber 11 and the chamber 13, is dependent on the flow area of the orifice 41. For example, assuming the pressure in the chamber 12 increases, the flow area through the orifice 31 is decreased by the action of the valve 30 in response to this pressure increase, and the pressure in the chamber 13 is decreased accordingly. This decrease in pressure in the chamber 13 causes a pressure differential to exist between the chambers 11 and 13 and pressure fluid will flow from the chamber 11 to the chamber 13 at a rate determined by the size of the flow area of the orifice 41 and the magnitude of the said pressure differential. Thus, the smaller the flow area through the orifice 41, the slower will be the bleeding action for a given pressure differential between the chambers 11 and 13. The slower this action is, the slower the action of the valve 30 will be, and accordingly, the longer will be the delay in the action of the elements 33 in response to this decrease in pressure in the chamber 11. Of course, these pressures will not equalize unless the pressure in the chamber 12 is at the desired value, i. e., the action of the valve 30 will increase the pressure in the chamber 13 in accordance with the decrease in pressure in the reset chamber 11.

In order to overcome the force of pressure fluid in the chamber 12 acting against the diaphragm 23, at any given pressure, and also to allow movement of the diaphragm 23, a spring 46 is mounted within the section 20 and biased between the bolt 25 clamped to the diaphragm 22, and an adjusting screw 47 threaded in the outer or free end of the section 20. Thus, the compression of the spring 46 may be adjusted by the screw 47 in accordance with the pressure differential between the chambers 11 and 12 to obtain a predetermined setting of the valve 30.

In the following description of the operation of the regulator, it will be assumed, for the sake of example, that the chamber 12 is communicated with the discharge side of a compressor (not shown), and that it is desired to maintain a discharge pressure of 100 p. s. i. It will also be assumed that at 100 p. s. i. pressure in the chamber 12, the difference in flow area between the fixed orifice 15 and the orifice 31 will be such as to maintain a control pressure of 50 p. s. i. This means, of course, that the pressure in the reset chamber 11 is also 50 p. s. i. Now, in the event the load on the machine decreases to a point where the pressure in the chamber 12 rises to 102 p. s. i., the diaphragm 23 will, accordingly, move upwardly thereby causing the needle valve 30, under the action of the spring 32, to be moved further into the orifice 31 to decrease the flow area therethrough. This results in a decrease in pressure in the control chamber 13 to, say, 40 p. s. i., thereby causing movement of one of the control elements 33 to reduce the output of said compressor, say to three-quarters of its full output. The pressure in the reset chamber 11, however, remains temporarily at 50 p. s. i. due to the fine restriction at the orifice 41. If the load demand remains at three-quarters of full capacity of the machine and the pressure in the chamber remains at 102 pounds for any length of time, the slow bleeding action from the chamber 11 to the chamber 13 due to the 10 pound differential therebetween, will lower the pressure in the chamber 11 causing the diaphragm 23 to move upwardly to close, further, the valve 30 an amount just sufficient to maintain the 10 pound pressure differential between the chambers 11 and 13.

When the pressure in the control chamber 13 drops to some predetermined value, a second control element 33 will be actuated to reduce, further, the output of the machine. This action continues until such time as the output just satisfies the demand at which time the pressure in the pressure chamber 12 will have returned to 100 p. s. i. and the spring 46 will depress the diaphragm 23, through the member 24, thereby moving the valve 30 to increase the flow rate of fluid into the chamber 13. This increased rate of flow into the chamber 13 increased the pressure therein to a value equal to that in the reset chamber 11 thereby halting the reset action. In this particular example, if the demand had been three-quarters of the total output of the compressor, the stable pressures at this output in the chambers 11 and 13 would, of course, have been 40 p. s. i.

In the event that demand increases, the reverse action occurs in which the diaphragm 23 moves the valve 30 to increase the flow area through the orifice 31 thereby increasing the pressure in the chamber 13 and the elements 33 are actuated to increase the output of said compressor. The pressure differential between the chambers 11 and 13 is, of course, reversed and the bleeding action occurs from the chamber 13 to the chamber 11.

It is now obvious from the previous discussion that a regulating device constructed in accordance with the practice of the invention accomplishes, among others, the objects hereinbefore stated, and provides a simple and durable regulating device capable of effective operation throughout the entire load range of the compressor or other machine to which it may be adapted. Also, the reset feature in response to a sustained load change will cause the control device to regulate the output of the machine to match the demand at a desired pressure and, further, will lead to stability of operation over periods of sudden load changes or demands.

While I have shown and described a specific form of my invention, it is to be understood that various changes and modifications may be made without departing from the spirit of the invention as set forth in the appended claims.

I claim:

1. A regulator comprising a body having a reset chamber, a pressure chamber and a control chamber therein, an inlet for constantly communicating the pressure chamber with a source of pressure fluid, control means responsive to pressure changes in the control chamber for controlling the machine to be regulated, means for communicating the reset chamber with the control chamber, an outlet for the continuous escape of pressure fluid from the control chamber, means for communicating the pressure chamber with the control chamber, and a valve acting in response to changes in pressure differential between said reset chamber and said pressure chamber for controlling the flow of pressure fluid into the control chamber.

2. A regulator comprising a body having a reset chamber, a pressure chamber and a control chamber therein, an inlet for constantly communicating the pressure chamber with a source of pressure, control means responsive to pressure changes in the control chamber for controlling the machine to be regulated, an orifice communicating the control chamber with the reset chamber to permit the flow of fluid between the reset and control chambers whenever there is a pressure differential therebetween, means for communicating the pressure chamber with the reset chamber, a valve acting responsively to changes in pressure differential between the reset chamber and the pressure chamber for controlling the flow of pressure fluid into the control chamber, and an atmospheric bleed for the control chamber.

3. A regulator comprising a body having a reset chamber, a pressure chamber and a control chamber therein, an inlet for constantly communicating the pressure chamber with a source of fluid pressure, control means responsive to pressure changes in the control chamber for controlling the machine to be regulated, an inlet for communicating the pressure chamber with the control chamber, an outlet for the control chamber to permit the constant flow of air from the control chamber, a valve for controlling the flow of pressure fluid through said inlet, means acting responsively to a pressure differential between the reset chamber and the pressure chamber to actuate said valve for controlling the flow of pressure fluid into said control chamber, means for communicating the control and reset chambers, and valve means for controlling the flow of pressure fluid between the control chamber and the reset chamber.

4. A regulator comprising a body having a reset chamber, a pressure chamber and a control chamber therein, a pressure fluid inlet for the pressure chamber, control means responsive to pressure changes in the control chamber for controlling the machine to be regulated, means for communicating the pressure chamber with the control chamber, a valve in the second said means for controlling the flow of pressure fluid between the pressure chamber and the control chamber, reciprocative means between the reset chamber and the pressure chamber acting responsively to changes in pressure differential therebetween for actuating said valve, an orifice for the control chamber to permit the escape of pressure fluid therefrom, means for communicating the control and reset chambers, and a means for controlling the flow of pressure fluid through the last said means.

5. A regulator comprising a body having a reset chamber, a pressure chamber and a control chamber therein, a pressure fluid inlet for the pressure chamber, control means responsive to pressure changes in the control chamber for controlling the machine to be regulated, diaphragms at the opposite ends of the reset chamber having unequal areas exposed to the said chamber, an atmospheric bleed for the control chamber, means for communicating the pressure and control chambers, a valve actuated by one of said diaphragms for controlling the flow of pressure fluid between the pressure chamber and the control chamber, means for connecting said diaphragms, means for communicating the control and reset chamber, and means for controlling the flow of pressure fluid between the control chamber and the reset chamber.

6. A regulator comprising a body having a reset chamber, a control chamber and a pressure chamber therein, an inlet for constantly communicating the pressure chamber with a source of pressure fluid, means for communicating the pressure and control chambers, a valve for controlling the flow of pressure fluid through said means, diaphragms enclosing the opposite ends of the reset chamber having unequal areas of surface exposed to said reset chamber, a member connected between said diaphragms for transmitting movement therebetween one of said diaphragms being positioned between the reset chamber and the pressure chamber and acting responsively to the pressure differential therebetween to actuate said valve, an outlet for the control chamber, means for communicating the reset and control chambers, and means for controlling the flow of pressure fluid through the last said means.

7. A regulator having a pressure chamber in constant communication with the source of fluid under pressure, a control chamber in communication with a means actuated in response to variations in pressure in the control chamber to control the device to be regulated, a passage communicating the control chamber with the pressure chamber, an orifice in the control chamber to permit pressure fluid to escape constantly from the control chamber to the atmosphere, a reset chamber in constant communication with the control chamber, a valve for controlling the rate of flow of pressure fluid through the control chamber to vary the pressure therein, and a member for actuating said valve in response to variations in pressure in the reset chamber and acting responsively to such changes in pressure to maintain a constant pressure differential between the reset chamber and the control chamber whenever the pressure in the pressure chamber deviates from a predetermined value.

8. A regulator having separate pressure, control and reset chambers, an inlet constantly communicating the pressure chamber with a source of pressure fluid, a passage for communicating the control chamber with the reset chamber, means for permitting pressure fluid to escape from the control chamber, a valve for controlling the flow of pressure fluid into the control chamber, and means responsive to variations in pressure differential between the reset chamber and the pressure chamber for actuating said valve and acting in response to changes in pressure in the reset chamber to maintain a constant pressure differential between the reset and control chamber by varying the rate of flow of pressure fluid into the control chamber whenever the pressure in the pressure chamber deviates from a predetermined value and acting responsively to variations in pressure in the pressure chamber to vary in inverse proportion the pressure in the control chamber by varying the rate of flow of pressure fluid into the control chamber.

9. A regulator having separate control, reset and pressure chambers therein, an inlet for constantly communicating the pressure chamber with the source of fluid under pressure, a passage communicating the control chamber with the reset chamber, a pressure fluid inlet and an outlet for the control chamber, a valve for controlling the rate of flow of pressure fluid through said inlet and outlet of the control chamber to vary the pressure therein, and a member having pressure surfaces exposed to pressure fluid in the pressure chamber and reset chamber and actuated in response to variations in pressure differential between the last two said chambers for actuating said valve.

10. A fluid actuated regulator having a pressure chamber in constant communication with a source of fluid under pressure, a control chamber having a pressure fluid inlet and an outlet for the escape of pressure fluid from the control chamber, a valve for controlling the rate of flow of pressure fluid through the control chamber for varying the pressure therein, a reset chamber in constant communication with said control chamber, and means acting in response to variations in pressure in the reset chamber to vary the rate of flow through the control chamber whenever a pressure differential exists between the reset and control chamber.

11. A regulator having a pressure chamber in communication with a source of fluid the pressure of which is to be controlled, a control chamber in communication with a means actuated by variations in pressure in the control chamber to control the device to be regulated, a passage communicating the control chamber with the pressure chamber, an outlet for the control chamber, valve means for controlling the flow of pressure fluid through the control chamber to vary the pressure therein, a reset chamber, means for varying the pressure in the reset chamber in response to variations in pressure in the control chamber, and means responsive to variations in pressure in said reset chamber for actuating said valve means to vary the pressure in the control chamber.

ARTHUR R. WORSTER.

REFERENCES CITED

The following references are of record in the file of this patent:

UNITED STATES PATENTS

| Number | Name | Date |
| --- | --- | --- |
| Re. 20,092 | Mason | Sept. 1, 1936 |
| 971,207 | Michel | Sept. 27, 1910 |
| 2,016,824 | Smith | Oct. 8, 1935 |
| 2,098,914 | Gorrie | Nov. 9, 1937 |
| 2,125,081 | Moore | July 26, 1938 |
| 2,285,540 | Stein | June 9, 1942 |
| 2,432,705 | Williams | Dec. 16, 1947 |